US006390365B1

(12) United States Patent
Karasawa

(10) Patent No.: US 6,390,365 B1
(45) Date of Patent: May 21, 2002

(54) TOLL COLLECTION SYSTEM, ONBOARD UNITS AND TOLL COLLECTION METHOD

(75) Inventor: Shigeru Karasawa, Kanagawa-ken (JP)

(73) Assignee: Kabushiki Kaisha Toshiba, Kanagawa-Ken (JP)

( * ) Notice: Subject to any disclaimer, the term of this patent is extended or adjusted under 35 U.S.C. 154(b) by 0 days.

(21) Appl. No.: 09/384,022

(22) Filed: Aug. 27, 1999

(30) Foreign Application Priority Data

Aug. 28, 1998 (JP) .......................................... 10-244003

(51) Int. Cl.[7] .......................... G07B 15/02; G06F 17/60

(52) U.S. Cl. .......................................... 235/384; 705/13

(58) Field of Search ................................ 235/384, 375; 705/1, 13; 340/928, 907, 929, 10.1–10.6; 455/73

(56) References Cited

U.S. PATENT DOCUMENTS 5,144,553 A * 9/1992 Hassett et al. ................ 705/13
5,266,785 A 11/1993 Sugihara et al. ............ 235/384
5,872,525 A * 2/1999 Fukasawa et al. .......... 340/928
5,926,546 A * 7/1999 Maeda et al. ................. 705/65
5,933,096 A * 8/1999 Tsuda ......................... 340/928
5,962,833 A * 10/1999 Hayashi ...................... 235/384
5,969,641 A * 10/1999 Nakamura et al. .......... 340/928
6,042,008 A * 3/2000 Ando et al. ................. 235/384
6,078,895 A * 6/2000 Ryu et al. ...................... 705/13
6,087,963 A * 7/2000 Kobayashi et al. ......... 340/928

FOREIGN PATENT DOCUMENTS

WO WO 95/08162 3/1995

* cited by examiner

*Primary Examiner*—Thien M. Le
*Assistant Examiner*—Jamara A. Franklin
(74) *Attorney, Agent, or Firm*—Pillsbury Winthrop LLP

(57) ABSTRACT

A toll collection system to collect tolls by way of wireless communication between an onboard unit that is loaded on a vehicle and stacks an IC card and a gate equipment that is installed at a tollgate. The gate equipment sends information showing the presence or the number of wireless communication equipment installed at the latter stage through the wireless communication to the onboard unit, which in turn causes the writing process on an IC card after executing the communication with all of the wireless communication equipment of the gate equipment.

10 Claims, 3 Drawing Sheets

TOLL COLLECTION SYSTEM, ONBOARD UNITS AND TOLL COLLECTION METHOD

BACKGROUND OF THE INVENTION

1. Field of the Invention

The present invention relates to a toll collection system to collect tolls from vehicles through wireless communication on such toll roads as expressways, an onboard unit that is loaded on vehicles to which this system is applicable and a toll collection method.

2. Description of the Related Art

Generally, as a toll collection system for exactly calculating tolls on toll roads, there is a magnetic card type toll collection system using tickets, prepaid cards, cash cards or currency.

In this magnetic card type toll collection system, a magnetic card recording entrance gate information to specify which entrance gate was used is issued as a ticket at an entrance gate into which a vehicle enters and a vehicle driver carries this ticket. At an exit gate, the entrance gate information recorded on the ticket carried by the driver is read and a toll is calculated. The calculated amount is presented to the driver and the calculated toll is collected in cash, by a pre-paid card, etc.

However, in the case of this magnetic card type toll collection system, what is needed for a driver at the entrance gate of a tollbooth is only to get a ticket from an automatic ticket issuing machine and therefore, there are not many traffic jams in the vicinity of the entrance gate. However, at the exit gate of a tollbooth there are extremely many work intensive tasks such as receiving/issuing of tickets/receipt, collection of tolls. Accordingly, there has been so far such a problem that when the number of vehicles using an expressway increased, the traffic was congested in the vicinity of an exit gate.

So, in an effort to relieve this traffic congestion, an ETC system (Electronic Toll Collection System), that is, a wireless card type toll collection system is being introduced in recent years. This ETC system is to collect a toll using an IC card that is set in an onboard unit through the wireless communication between an onboard unit loaded on a vehicle and a roadside equipment including antennas installed at a tollgate.

In other words, at an entrance gate, a vehicle with an onboard unit loaded (hereinafter, referred to as an ETC vehicle) is controlled so as to store entrance gate information in an IC card that is set in its onboard unit through wireless communication with a roadside equipment installed at the entrance gate. On the other hand, at an exit gate, the entrance information is read from an onboard unit and an IC card of an ETC vehicle through wireless communication with a roadside equipment installed at the exit gate. A toll is automatically calculated based on this read entrance information. As a method to automatically calculate tolls, there are such methods as a method to record a pre-paid amount on an IC card and use this IC card as a pre-paid card; a method to record a contract information to specify user's deposit account, etc. in advance on an IC card and use this IC card as a credit card, etc.

One should note that, in such ETC systems as this, the writing speed on IC cards is slower than the wireless communication speed and therefore, an onboard unit starts the writing on an IC card after completing the wireless communication process with a roadside equipment.

However, there are such tollgates where a plurality of antennas are installed along the entering direction of vehicles, for instance, a first antenna, a second antenna and so on. In this case, an onboard unit is required to start the writing on an IC card and also the communication with a second antenna after the communication with a first antenna.

If a high efficiency processor (CPU) is loaded into an onboard unit, it becomes possible to execute the write process on IC card in parallel with the communication process with a second antenna but the price of an onboard unit becomes expensive.

Further, the number of antennas that are installed at a tollgate is determined according to the operation but may possibly be changed in the future. As a person substantially controlling an onboard unit is an end-user himself (herself), it is not easy to change the software of an onboard unit and it is necessary to make an arrangement to be able to cope with the wireless communication flexibly regardless of the number of antennas.

SUMMARY OF THE INVENTION

It is an object of the present invention to provide a toll collection system, an onboard unit and a toll collection method that are capable of flexibly coping with the toll collection without changing the functions of an onboard unit regardless of the number of antennas that are installed at a tollgate.

According to the present invention, a toll collection system is provided which to collect a toll through wireless communication between an onboard unit carried by a vehicle, stacking an IC card and a gate equipment installed at a tollgate. The system comprises: said gate equipment including: wireless communication means for performing the wireless communication with said onboard unit; and notification means for sending a notification information showing the presence of, the number of or time until arrival at wireless communication means installed along the proceeding direction of a vehicle to said onboard unit through said wireless communication means; and said onboard unit including: means for writing data sent from said wireless communication means onto said. IC card after executing the communication process with all of the wireless communication means based on said notification information.

Further, according to the present invention, an onboard unit capable of being carried by a vehicle and which performs wireless communication with a tollgate showing data of the passing through of vehicles through a wireless communication means installed at the tollgate is provided. The onboard unit comprises receiving means for receiving notification information showing the presence of, the number of or time until arrival at wireless communication means installed at the latter stage along the proceeding direction of said vehicle; and means for writing data sent from said wireless communication means onto an IC card stacked in said onboard unit after executing the communication process with all of said wireless communication means based on said notification information received by said receiving means.

Further, according to the present invention, a method is provided to collect a toll through the wireless communication between the onboard unit carried by a vehicle, stacking an IC card and a gate equipment installed at a tollgate. This method comprises sending notification information showing the presence or the number of wireless communication means installed at the latter stage from said gate equipment to said onboard unit through wireless communication means; and said onboard unit starting writing process to an IC card after executing the communication process with all of the wireless communication means of said gate equipment based on said notification information.

DETAILED DESCRIPTION OF THE PREFERRED EMBODIMENTS

Preferred embodiments of the present invention will be described below referring to the attached drawings.

Figure 1:
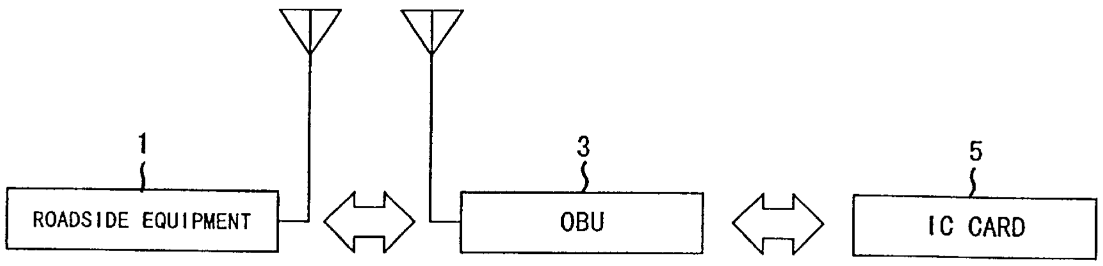
FIG. 1 is a block diagram showing the outline of an ETC system to which a toll collection system of the present invention is applicable.

In FIG. 1, an ETC system is generally composed of a roadside equipment 1 that is installed at a tollgate, an onboard unit 3 that is loaded on a vehicle for a wireless communication with the roadside equipment 1, and an IC card 5 that is detachably set in the onboard unit 3 for reading/writing information. The wireless communication between the roadside equipment 1 and the onboard unit 3 is executed at a relatively high speed in order to exchange information stored in their internal buffer memories. On the contrary, an IC card 5 has a flash memory in its inside and writes/reads information from the onboard unit 3 to/from this flash memory. Therefore, the information writing speed to the IC card 5 is at a especially lower speed than the communication speed between the roadside equipment 1 and the onboard unit 3.

Figure 2:
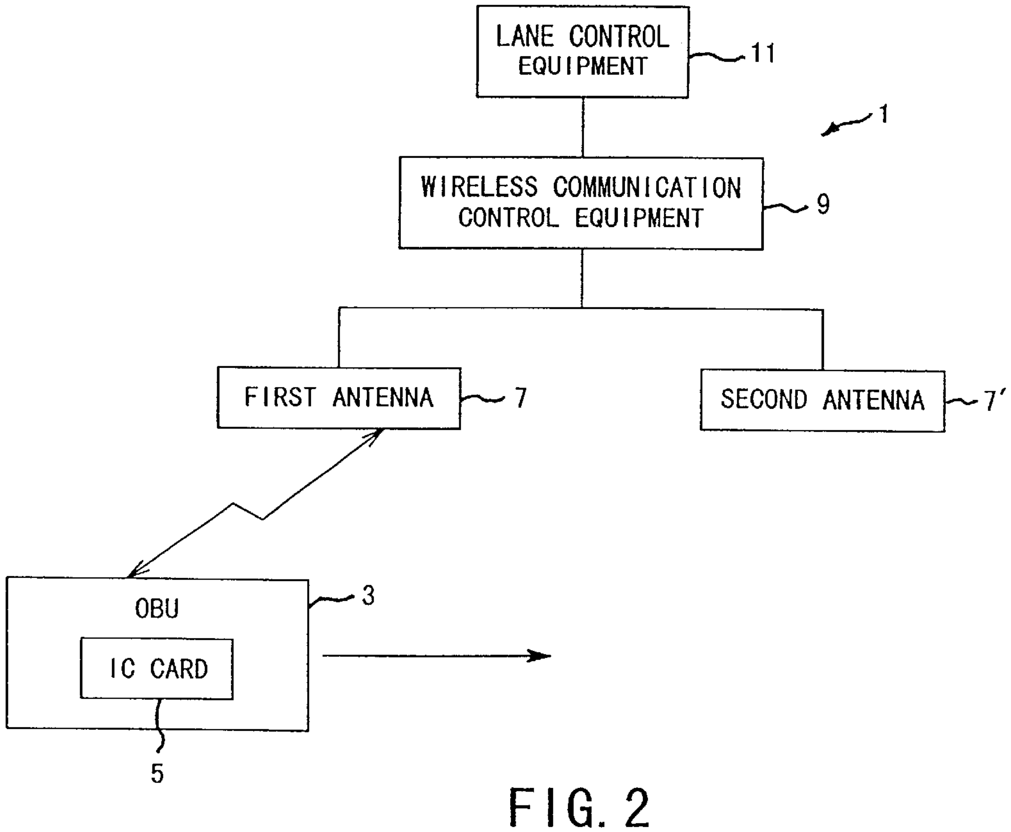
FIG. 2 is a block diagram showing the communication status between an onboard unit and a first and second antennas in the toll collection system of the present invention.

In FIG. 2, the roadside equipment 1 is composed of a first antenna 7, a second antenna 71, a wireless communication control equipment 9 that controls the. communication between these antennas and the onboard unit 3 and a lane control equipment 11 that performs the valid or invalid judging process of IC cards according to the result of wireless communication process that is input by the wireless communication control equipment 9.

Figure 3:
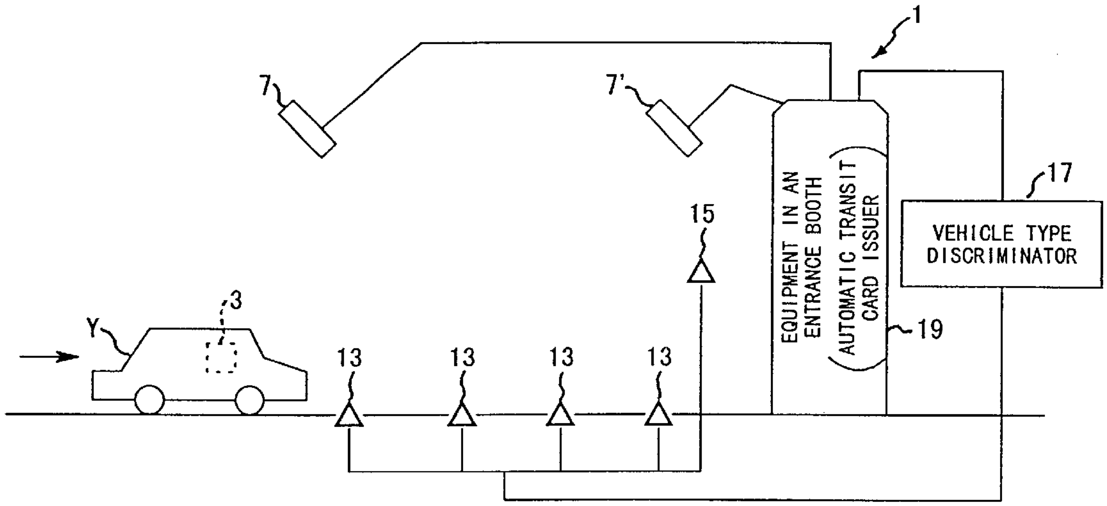
FIG. 3 is a block diagram showing an example of the structure of an entrance gate in the toll collection system of the present invention.

FIG. 3 shows a definite structure of the roadside equipment 1 that is installed at the entrance gate. The roadside equipment 1 at the entrance gate comprises the first antenna 7, a vehicle length detector 13, a vehicle height detector 15, the second antenna 7', a vehicle type discriminator 17 and an equipment in an entrance booth 19 that are arranged in order.

The first antenna 7 makes the wireless communication with a vehicle X entering into a specified area in front of the entrance gate.

The vehicle length detector 13 and the vehicle height detector 15 detect the length and height of the vehicle Y, respectively and based on the results of detection, a type of vehicle such as large type, normal type, small type, etc. is discriminated by the vehicle type discriminator.

The second antenna 7' makes the wireless communication with the vehicle Y once it has passed the vehicle length detector 13 and the vehicle height detector 15.

The equipment in the entrance booth 19 judges whether the vehicle Y entering into the entrance gate is an ETC vehicle by the wireless communication with the vehicle Y through the first antenna 7. Further, such information as Entrance Gate Number, Gate Entering Time, etc. are sent to an ETC vehicle through the first antenna 7 and such information as the type of the vehicle Y discriminated by the vehicle type discriminator 17, etc. are sent to the vehicle Y through the second antenna 7'.

Further, the equipment in the entrance booth 19 is equipped with a ticket issuing machine to issue tickets to non-ETC vehicles.

That is, the equipment in the entrance booth 19 comprises the wireless communication control equipment 9 that controls the wireless communication of the first and second antennas 7 and 7' by inputting the information on discriminated vehicle type from the vehicle type discriminator 17 and the ticket issuing machine that is controlled by the wireless communication control equipment 9.

Figure 4:
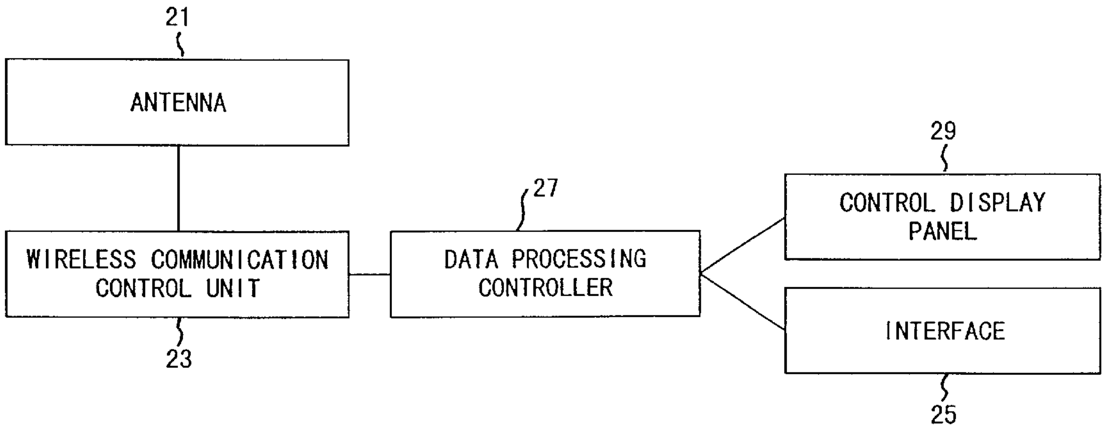
FIG. 4 is a block diagram showing the structure of an onboard unit to which the toll collection system of the present invention is applicable.

As shown in FIG. 4, the onboard unit 3 that is loaded on a vehicle Y comprises an antenna 21, a wireless communication control unit 23 that makes the wireless communication with the roadside equipment 1 through the antenna 21, an interface 25 with the IC card 5, a data processing controller 27 that reads recorded data from the IC card 5 through the interface 25 and write the data received through the wireless communication control unit 23 in the IC card 5 through the interface 25 and a control display panel 29 that is equipped with a plurality of buttons that are operated by a user to display a guide of control contents, etc.

Figure 5:
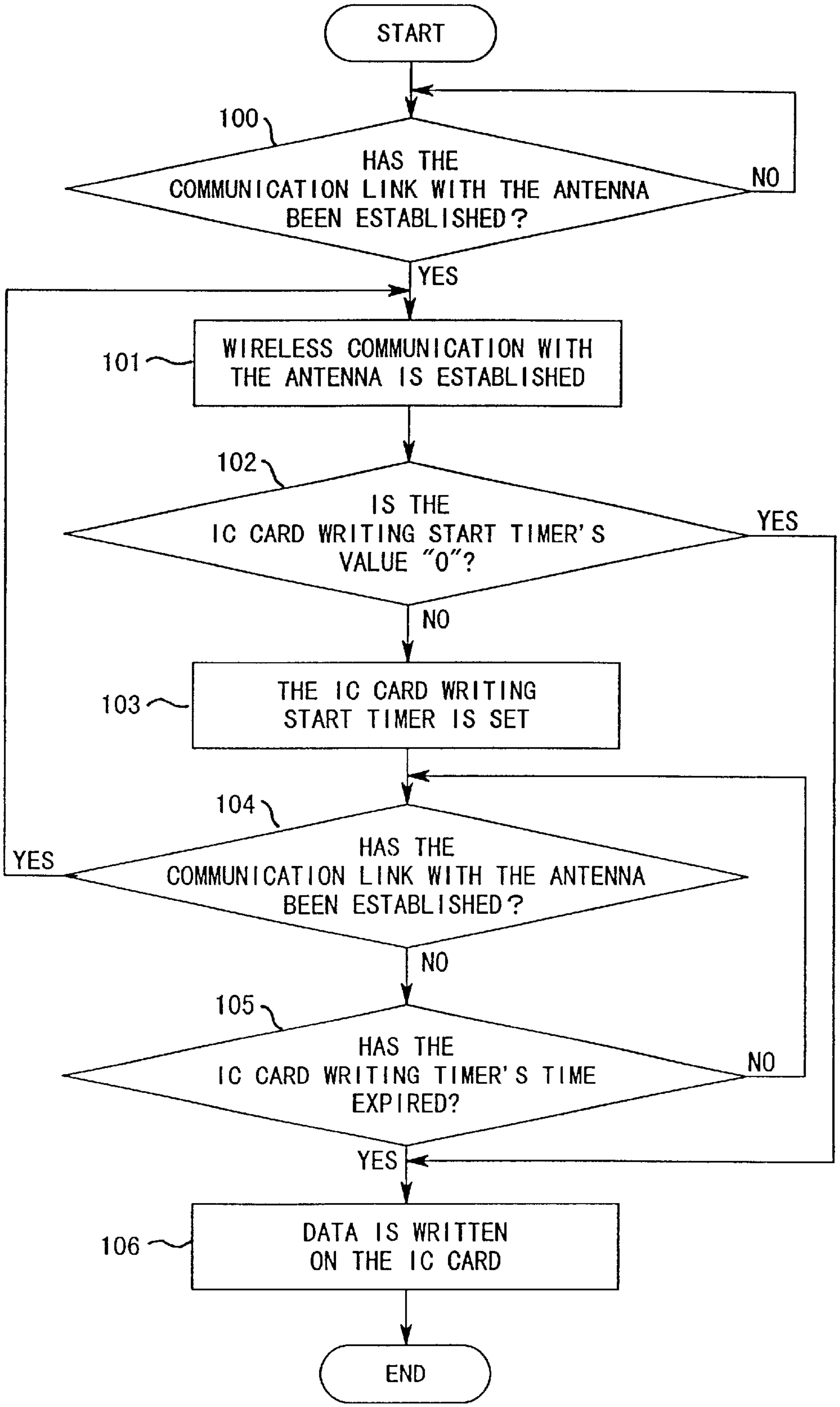
FIG. 5 is a flowchart showing the processes of an onboard unit in the toll collection system of the present invention.

Then, in an ETC system of this embodiment, the onboard unit 3 executes the processes as shown in FIG. 5. That is, by judging whether the communication link between the onboard unit 3 and the antenna of the roadside equipment 1 is established (STEP 100), when judged that it is established, the wireless communication is executed between the onboard unit 3 and the roadside equipment 1. (STEP 101). In other words, a traveling time required to a next antenna, for instance, “5 seconds” is sent as a timer value from the roadside equipment 1 to the onboard unit 3. Further, such entrance information as Road Number of Entrance Gate, Tollgate Number, Passing Date and Time, Lane Number, etc. are sent. In the wireless communication with the roadside equipment 1, it is judged whether the IC card writing start timer value sent from the roadside equipment 1 is 0 (STEP 102). When the IC card writing start timer value is not 0, the value, that is, “5 seconds” is set on a timer (STEP 103) and the establishment of the communication link with the next antenna is awaited (STEP 104). The time set on the IC card writing start timer is compared with a time till the next communication link (STEP 105). When the communication link is not established within the time set on the timer, the data writing on the IC card 5 is started (STEP 106). “The case where the communication link was not established within a time set on the timer” in the above STEP 106 is such cases as when a vehicle Y stopped between the first and second antennas 7 and 7' due to traffic congestion or when the second antenna 7' became defective and the communication link could not be separated from the onboard unit 3. Accordingly, when STEP 105 only was executed, information from the first antenna only is recorded on the IC card 5 and information from the second antenna 7' is not recorded. Further, in the case where a communication link is established with second antenna 7' after information from the antenna 7 is recorded on the IC card 5, due to traffic congestion and so forth arrival at the second antenna 7' being late, communication is then made, after which the recording process is performed.

On the other hand, when the communication link is established within the set time on the timer (i.e., STEP 104 results in a "YES"), the step returns to STEP 101 and the onboard unit 3 executes the wireless communication process with the roadside equipment 1. Then, in STEP 102 it is again judged whether the IC card starting timer value sent in the wireless communication of this time is 0 and if the IC card writing start timer value is 0 or it "No next antenna" is indicated, it is judged that there is no next wireless communication process and the step goes to STEP 106 and the data writing on the IC card 5 is started. That is, it before the time "5 seconds" set on the timer is over a vehicle passes the second antenna 7' and information from the first antenna 7 and the second antenna 7' are recorded on the IC card 5. Further, information sent from the first antenna 7 is temporarily stored in the onboard unit 3 and after passing the second antenna 7' as mentioned above, the information stored in this onboard unit 3 is recorded on the IC card 5 together with the information from the second antenna 7'.

Accordingly, when the processes were executed in order of STEPS 101→102→103→104→101→102→106 it means that a vehicle passed the first and second antennas 7 and 7' properly.

Thus, the onboard unit 3 receives such information showing the presence of the communication process with a next antenna as "IC card writing start timer value" for every communication process with the antenna of the roadside equipment 1. As a result, regardless of the number of antennas installed at the roadside equipment 1 side, it is possible to specify the IC card writing process start timing so as to execute the data writing on an IC card 5 after the communication process with all antennas.

Next, taking the process at the entrance gate shown in FIG. 3 as an example, the actions of the toll collection system in this embodiment will be described.

The wireless communication control equipment 9 of the equipment in the entrance booth 19 makes an inquiry for communication to an onboard unit 3 through the first antenna at a fixed period or other specified timings. When an onboard unit 3 loaded on a vehicle Y enters into a communication area, in response to the inquiry from the first antenna 7, the onboard unit 3 reads such data as contract information cr charging information, etc. from an IC card 5 and sends the data together with onboard unit information retained by an onboard unit to the first antenna 7 as a response signal.

When receiving the response signal from an onboard unit 3, the wireless communication control equipment 9 checks the onboard unit information and the information on the available periods of IC card contract or charging and confirms that the balance is not 0 and if the specified condition is satisfied as the result of checking, sends such information of "a writing start timer value", etc. showing the presence of next antenna together with the entrance information such as Road Number of Entrance Gate, Tollgate Number, Passing Date and Time, Lane Number, etc. to an onboard unit 3 from the first antenna.

When receiving, for instance, a "writing start timer value" together with the entrance information, an onboard unit 3 sets that time value on the writing start timer if the value is not 0 and sends a receipt completion notice to the first antenna.

When receiving the receipt completion notice through the first antenna 7, the wireless communication control equipment 9 makes the ticket issuing machine not issue a ticket. Further, when the receipt completion notice was not received from an onboard unit 3, the wireless communication control equipment 9 judges that the communication is faulty and makes the ticket issuing machine to issue a ticket after receiving a type of vehicle discrimination information from the vehicle type discriminator 17. Further, when no response was received to the communication inquiry from the first antenna 7 and a vehicle was detected by the vehicle length detector 13, the wireless communication control equipment 9 judges that a non-ETC vehicle is passing and makes the ticket issuing machine to issue a ticket.

The vehicle type discriminator 17 detects the entry of a vehicle Y by a first vehicle length detector 13 and notifies the wireless communication control equipment 9 of it and further, discriminates a vehicle type of the vehicle Y by detecting its length by another vehicle length detector 13 and its height by a vehicle height detector 15 and notifies the discriminated vehicle type information to the wireless communication control equipment 9.

The wireless communication control equipment 9 starts the communication inquiry to this vehicle Y through the second antenna 7' according to the vehicle detecting signal from the first vehicle length detector 13 and similarly the first antenna 7, after receiving a response signal from an onboard unit 3, sends the discriminated vehicle type information from the vehicle type discriminator 17 and the IC card writing start timer value "0" to the onboard unit 3 of that vehicle.

When receiving the discriminated vehicle type information and the IC card writing start timer value from the second antenna 7', the onboard unit 3 sends a receipt completion notice to the second antenna and since the IC card writing start timer value is "0", writes the entrance information received from the first antenna 7 and the discriminated vehicle type information on an IC card 5.

Further, if the IC card writing start timer that is set by the communication with the first antenna 7 is over before receiving the communication inquiry from the second antenna 7', an onboard unit 3 starts to write the entrance information received from the first antenna 7 on the IC card 5. At this time, if a vehicle enters into the communication area of the second antenna 7' before completing the writing of the entrance information on the IC card, the vehicle passes through the entrance gate without making the wireless communication process with the second antenna 7'. On the other hand, when the writing on the IC card 5 is completed before entering into the communication area of the second antenna 7', the vehicle executes the wireless communication process with the second antenna 7' and writes the discriminated vehicle type information on the IC card 5.

Further, the IC card writing timer values from the first antenna 7 and the second antenna 7' can be sent when making the communication inquiry.

As is clear from the above-mentioned explanation, according to the present invention, the timing for starting to write on an IC card is designated by an IC card writing timer value, etc. to an onboard unit 3 from the roadside equipment 1. Thus, it becomes unnecessary to complete the communication process after the second antenna with the IC card writing process by an onboard unit 3 even at a tollgate equipped with a plurality of antennas. Accordingly, even an onboard unit 3 without a highly efficient CPU loaded is able to cope with the tollgate process smoothly without being influenced by the number of antennas installed at a tollgate.

Further, in the above-mentioned embodiment, "IC card writing timer value" is sent from each of the antennas but is not restricted to this, by sending "Flag showing the presence of the communication process with next antenna" or "Number of antennas that should perform the communication process before starting the writing on IC card", the same effect can be obtained. Further, it is also acceptable when beforehand in the onboard unit's memory "IC card writing time value" has already been recorded and based on this value, writing on the IC card has been performed.

As described above, according to the present invention, regardless of the number of antennas installed at the tollgate side, it is possible to start the writing process on IC cards at a good timing after the communication process with antennas at an onboard unit side. Accordingly, without incorporating a highly efficient CPU in an onboard unit, it is possible to cope with the gate process smoothly without being influenced by the number of antennas installed at a tollgate.

What is claimed is:

1. A toll collection system to collect a toll through wireless communication between an onboard unit carried by a vehicle, stacking an IC card and a gate equipment installed at a tollgate, comprising:

said gate equipment including:

wireless communication means for performing the wireless communication with said onboard unit; and notification means for sending notification information showing a writing start timer value and passing time to the onboard unit received from said wireless communication means onto said IC card; and said onboard unit including:

timer setting means for setting a waiting time till the onboard unit starts to write the passing time sent from the wireless communication means onto said IC card;

means for writing the passing time sent from said wireless communication means onto said IC card after the waiting time set on said timer setting means was over.

2. An onboard unit capable of being carried by a vehicle and which performs wireless communication with a tollgate concerning data showing the passing through of vehicles via first wireless communication means installed at the tollgate, comprising:

means for judging the presence of second wireless communication means installed along the proceeding direction of the vehicle based on notification information showing the presence of, the number of or time until arrival at the second wireless communication means of the vehicle;

timer setting means for setting a waiting time till the start of a next wireless communication based on a judgment by said judging means; and means for writing data obtained through a communication process with said first wireless communication means when the next wireless communication was not started even after the waiting time set on said timer setting means was over.

3. The onboard unit according to claim 2, wherein said timer setting means sets the waiting time at 0 (zero) when said judging means judges that there is no second wireless communication means installed along the proceeding direction of the vehicle, and at a specified time greater than 0 (zero) when there is second wireless communication means installed along the proceeding direction of the vehicle.

4. An onboard unit capable of being carried by a vehicle and which performs wireless communication with a tollgate showing data of the passing through of vehicles through wireless communication means installed at the tollgate, comprising:

receiving means for receiving notification information showing a writing start timer value and passing time sent from said wireless communication means onto an IC card stacked in said onboard unit;

timer setting means for setting a waiting time till the onboard unit starts to write the passing time sent from the wireless communication means onto said IC card; and means for writing data sent from said wireless communication means onto the IC card after the waiting time set on said timer setting means was over.

5. The onboard unit according to claim 4 further comprising:

means for storing time information to indicate the start of the writing process onto the IC card;

means for counting a specified time based on the time information stored in said storing means when the receiving means receives the notification information indicating that second wireless communication means is present; and means for writing data received from the tollgate onto the IC card after counting the specified time by the counting means.

6. An onboard unit capable of being carried by a vehicle and which performs wireless communication with a tollgate showing data of the passing through of vehicles through wireless communication means installed at the tollgate, comprising:

receiving means for receiving notification information showing a timing in a plurality of timings for writing data which the onboard unit received from said wireless communication means onto an IC card stacked in said onboard unit; and means for writing data sent from said wireless communication means onto the IC card after executing a communication process with all of said wireless communication means at said timing based on said notification information received by said receiving means;

wherein said writing means includes:

means for judging the presence of second wireless communication means based on said notification information;

timer setting means for setting a waiting time till the start of a next wireless communication based on a judgement made by said judging means; and means for writing data obtained through the communication process with said first wireless communication means when said next wireless communication is not started even when a waiting time set on said timer setting means is over.

7. An onboard unit capable of being carried by a vehicle and which performs wireless communication with a tollgate showing data of the passing through of vehicles through wireless communication means installed at the tollgate, comprising:

receiving means for receiving notification information showing a timing in a plurality of timings for writing data which the onboard unit received from said wireless communication means onto an IC card stacked in said onboard unit; and means for writing data sent from said wireless communication means onto the IC card after executing a communication process with all of said wireless communication means at said timing based on said notification information received by said receiving means;

wherein said writing means includes:

means for judging the presence of second wireless communication means based on said notification information;

timer setting means for setting a waiting time till the start of a next wireless communication based on a judgement made by said judging means; and means for writing data obtained through the communication process with said first wireless communication means when said next wireless communication is not started even when a waiting time set on said timer setting means is over;

wherein said timer setting means sets a waiting time at 0 (zero) when said judging means judges that there is no second wireless communication means, and at a specified time greater than 0 (zero) when there is the second wireless communication means.

8. A toll collection method to collect a toll through wireless communication between an onboard unit carried by a vehicle, stacking an IC card and first wireless communication means included in a gate equipment installed at a tollgate, comprising the steps of:

sending notification information showing the presence or the number of second wireless communication means installed along the proceeding direction of said vehicle from said gate equipment to said onboard unit through said first wireless communication means; and writing data sent from said first wireless communication means onto the IC card after executing a communication process with all of the wireless communication means based on said notification information.

9. The toll collection method according to claim 8, wherein said onboard unit judges the presence of second wireless communication means based on said notification information, sets a waiting time till the start of a next wireless communication based on a judgment and writes data obtained through the communication process with said first wireless communication means when said next wireless communication is not started even after the set waiting time is over.

10. The toll collection method according to claim 9, wherein the waiting time till the start of said next wireless communications 0 (zero) when there is no second wireless communication means and at a specified time greater than 0 (zero) is set when there are second wireless communication means.

* * * * *